Patented Oct. 16, 1923.

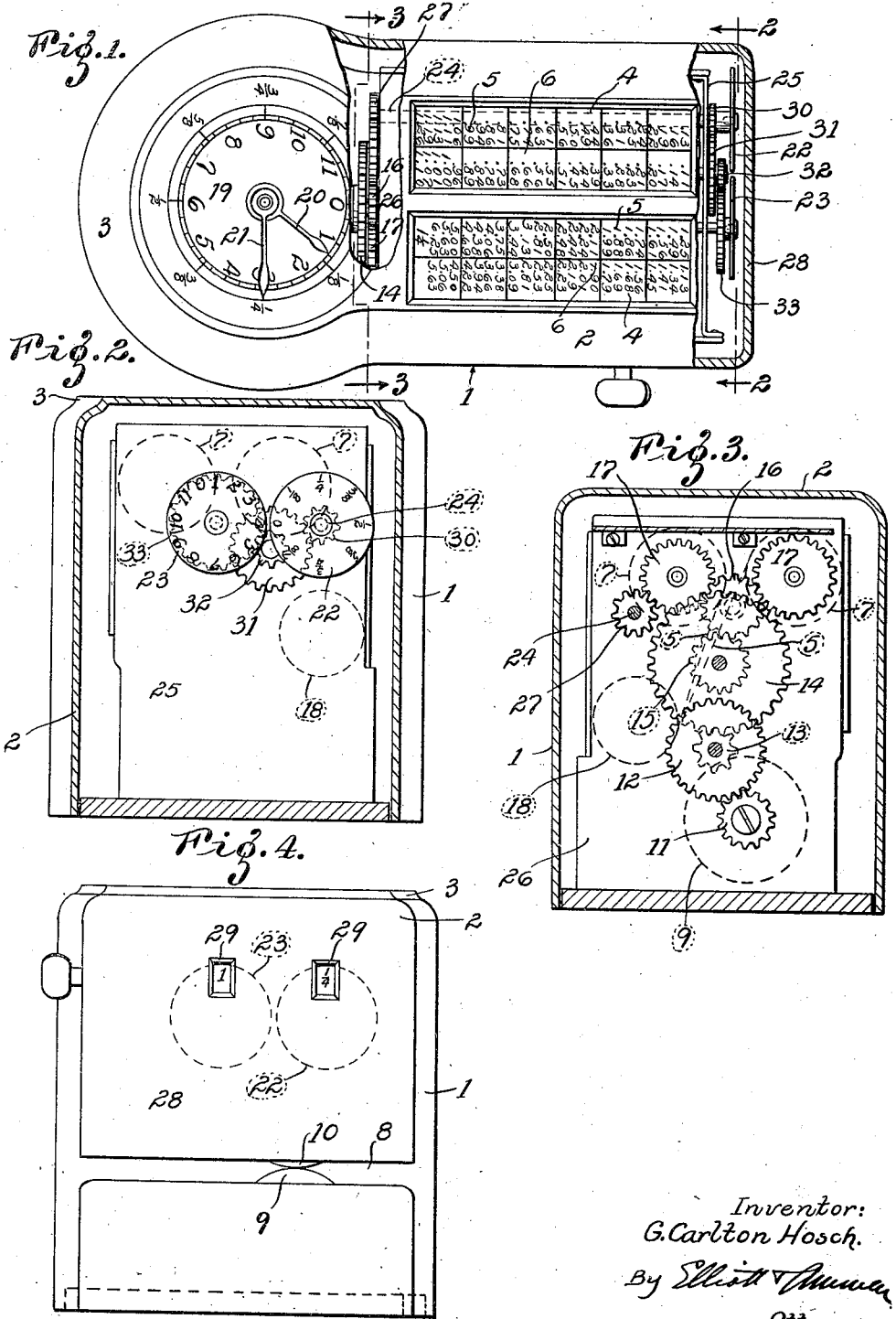

1,470,840

UNITED STATES PATENT OFFICE.

GREENE CARLTON HOSCH, OF ST. LOUIS, MISSOURI, ASSIGNOR TO THE MEASURE-GRAPH COMPANY, OF ST. LOUIS, MISSOURI, A CORPORATION OF DELAWARE.

INDICATING MEANS FOR MEASURING MACHINES.

Application filed July 18, 1921. Serial No. 485,464.

*To all whom it may concern:*

Be it known that I, GREENE CARLTON HOSCH, a citizen of the United States, residing in the city of St. Louis and State of Missouri, have invented new and useful Improvements in Indicating Means for Measuring Machines, of which the following is a specification.

This invention relates to measuring and cost computing machines such as used by salesmen in selling goods across a counter. While features of the invention are applicable to machines for measuring various goods, the invention is expected to be especially useful as applied to fabric measuring and cost computing machines. Machines of this general type include indicating mechanism which provides means visible on the upper side of the casing of the instrument which indicates the length of goods measured and also the computed selling charge for different rates or prices per yard. The figures are placed or oriented so as to be read from the position of the salesman at one end of the instrument. Hence, the figures that indicate the length are inverted as regards the purchaser who is standing nearer to the opposite end of the casing.

The general object of the present invention is to provide simple means for indicating to the purchaser, as well as the salesman the length of goods which the machine has measured.

Further objects of the invention will appear hereinafter.

The invention consists in the novel features, and in the general combination of parts to be particularly described hereinafter, all of which contribute to produce a simple and efficient purchaser's indicator for measuring machines. A preferred embodiment of my invention will be particularly described in the following specification, while the broad scope of my invention will be pointed out in the appended claims.

In the drawing:

Figure 1 is a plan of a machine embodying my invention, certain parts being broken away to illustrate the means for actuating the purchaser's indicator;

Figure 2 is a vertical section taken about on the line 2—2 of Figure 1;

Figure 3 is a section taken about on the line 3—3 of Figure 1; and

Figure 4 is an elevation of the outer end of the machine.

The machine comprises an outer casing 1 which in the present instance has a substantially rectangular portion 2 and a substantially circular portion 3. The upper side of the casing at the rectangular portion 2 is provided with windows 4 at which charts 5, 5 are exposed, said charts forming part of the salesman's indicating mechanism of the instrument and bearing computed figures (see Fig. 1) which register with price rate figures carried on two corresponding scales 6. When the instrument is measuring, these charts wind up upon take-up rollers 7 (see Fig. 3). The measuring operation is accomplished in the usual way by pulling the cloth through a horizontal gap 8 in the casing (see Fig. 4) so that it passes between the measuring roller 9 and the presser roller 10. Through suitable driving mechanism consisting of a gear train (see Fig. 3) the measuring roller 9 drives the two take-up rollers 7. For this purpose the shaft of the measuring roller 9 carries a rigid pinion 11 which drives a gear wheel 12 rigid with a pinion 13, which in turn drives a large gear wheel 14. This gear wheel carries a rigid pinion 15 which drives an idle pinion 16 which meshes with two gear wheels 17 secured to the shafts of the rollers 7. The lower ends of the charts or webs 5 are wrapped upon a common supply roller or drum 18. In addition to the computed figures on the charts 5, 5 one chart also carries numbers such as the number 1¼ (see Fig. 1) which indicate the length of the measurement. This number 1¼ is one of a series of numbers increasing by eighths of a yard. In addition to these numbers on the chart for indicating the length measured, the upper side of the casing is also provided with a measuring dial 19 arranged to measure twelve yards, and fractions of a yard increasing by eighths. Co-operating with this dial there is provided a slow-moving yard hand 20 and a fast-moving yard-fraction hand 21. The mechanism for driving these hands forms no part of this invention but may be of the type illustrated in Patent No. 1,336,230, of April 6, 1920, granted to the administratrix of W. E. Hosch, deceased.

In order to enable the measured length to be indicated to the purchaser I provide indicating members which are disposed in a substantially vertical plane and driven in unison with the indicating mechanism of the instrument. These indicating members carry numbers which are visible to the purchaser standing at the other end of the machine opposite to the salesman's position, it being understood that the salesman stands opposite the substantially circular end of the machine. In order to accomplish this I prefer to provide indicating means including two vertical indicating dials or dial wheels 22 and 23 (see Figs. 1 and 4), the former of which is driven by a driving shaft 24 which passes horizontally from a point in proximity to the salesman's end of the machine to the purchaser's end. In the present instance I mount the dial wheel 22 directly on the shaft 24. The outer end of this shaft is supported in an outer frame plate 25, remote from the salesman's position, while the inner end is supported in a vertical main frame plate 26 (see Figs. 1 and 3). This shaft 24 is rotated continuously in unison with the chart by means of a small pinion 27 which meshes with the gear wheel 17 of the adjacent chart roller 7.

The casing presents a substantially vertical outer wall 28 and the disks or dials 22 and 23 are disposed just within this wall. The wall is provided with two windows or sight-openings 29 through which respectively, a portion of one side of each of these dials is visible. The dial 23 indicates yards and the dial 22 indicates yard-fractions increasing by eighths of a yard. The dial 23 is driven from the dial 22 by means of a pinion 30 on the shaft 24 which meshes with a gear wheel 31 carrying rigid therewith a pinion 32 meshing with a gear wheel 33 which is rigid with a stub shaft which carries the dial 23. As the measuring movement takes place the numbers on these dials present themselves in succession at the sight-openings 29. For example, in the present instance when the chart and the dial 19 indicate the measurement of 1¼ yards the dials 22 and 23 likewise indicate 1¼ yards.

In the operation of the machine the presser roller 10 is held raised while the fabric is being inserted through the gap 8; then the presser roller is pemitted to descend upon the fabric and holds it against the upper face of the measuring roller.

It is understood that the embodiment of the invention described herein is only one of the many embodiments my invention may take, and I do not wish to be limited in the practice of my invention nor in my claims, to the particular embodiment set forth.

What I claim is:

1. In a measuring and cost computing machine to be used by salesmen in selling goods across a counter, the combination of a casing, indicating mechanism including chart rollers rotatably mounted in the upper portion of the casing, charts wound upon the chart rollers and bearing computed numbers representing charges corresponding to the length of the goods measured, said numbers being oriented so as to be read by the salesmen standing adjacent one end of the casing, a shaft extending longitudinally of the machine, said casing having a wall at the other end thereof with sight-openings therein, indicating members behind said wall, and means for driving the same by said shaft in unison with said rollers, said indicating members carrying numbers adapted to register with the sight-openings to indicate the length measured, to the purchaser standing at the end of the machine opposite to the salesman.

2. In a measuring and cost computing machine to be used by salesmen in selling goods across a counter, the combination of a casing, a frame within the casing including a main frame plate and an outer frame plate, chart-rollers supported between the frame plates, charts adapted to wind onto the rollers and bearing numbers corresponding to the length of the goods measured, said numbers being oriented so as to be read by the salesmen standing adjacent one end of the casing, gearing for driving the rollers mounted on the main frame plate, a driving shaft driven by said gearing and extending from the main frame plate through the outer frame plate, said casing having a wall adjacent the outer frame plate with sight-openings therein, and indicating members mounted on the outer frame plate behind said wall and driven by said driving shaft, said indicating member carrying numbers adapted to register with the sight-openings to indicate the length measured, to the purchaser standing at the end of the machine adjacent the outer frame plate.

3. In a measuring and cost computing machine to be used by salesmen in selling goods across a counter, the combination of a casing, a length indicating numbered dial and movable pointers co-operating therewith, a chart roller within the casing, a shaft extending longitudinally with the roller, a chart wound upon the roller having computed numbers indicating charges to be made at different price rates and corresponding to the measurements indicated on the dial, the numbers on the dial and said computed numbers being oriented so as to be read by the salesman standing adjacent one end of the casing, indicating members disposed in a substantially vertical plane, means for driving the same by the said shaft in unison with the said pointers and chart, and carrying numbers visible to the purchaser standing at the other end of the machine opposite to the salesman.

4. In a measuring and cost computing machine to be used by salesmen in selling goods across a counter, the combination of a casing, a measuring roller, indicating mechanism including a chart supported in the upper portion of the casing and bearing computed numbers indicating charges corresponding to the length of the goods measuered, said numbers being oriented so as to be read by the salesman standing adjacent one end of the casing, gearing at that end of the casing driven by the measuring roller, a shaft driven by said gearing, extending longitudinally of the casing, indicating means including movable indicating members located at the other end of the casing, means for driving the same by said shaft in unison with the chart to indicate the length measured to the purchaser standing at the end of the machine opposite to the salesman.

5. In a measuring and cost computing machine to be used by salesmen in selling goods across a counter, the combination of a casing, a measuring roller, salesman's indicating mechanism driven by said roller and including a chart supported in the upper portion of the casing and bearing computed numbers indicating charges corresponding to the length of the goods measured, said numbers being oriented so as to be read by the salesman standing adjacent one end of the casing, a frame within the casing including a frame plate at the end of the casing remote from the salesman's position, a shaft mounted in the frame and supported at one end in the said frame plate, means for driving said shaft in unison with the chart, a purchaser's indicator adjacent said frame plate, and means for driving the same by said shaft to indicate the length measured to the purchaser standing at the end of the machine opposite to the salesman.

6. In a measuring and cost computing machine to be used by salesmen in selling goods across a counter, the combination of a casing, a measuring roller, salesman's indicating mechanism driven by said roller and including a chart supported in the upper portion of the casing and bearing computed numbers indicating charges corresponding to the length of the goods measured, said numbers being oriented so as to be read by the salesman standing adjacent one end of the casing, a frame within the casing including a frame plate at the end of the casing remote from the salesman's position and a frame plate nearer to the other end of the machine, a shaft supported in the frame plates, means for driving said shaft in unison with the chart, and a purchaser's indicator adjacent the first named frame plate driven by said shaft to indicate the length measured to the purchaser standing at the end of the machine opposite to the salesman.

In testimony whereof, I have hereunto set my hand.

G. CARLTON HOSCH.